Figure 4:
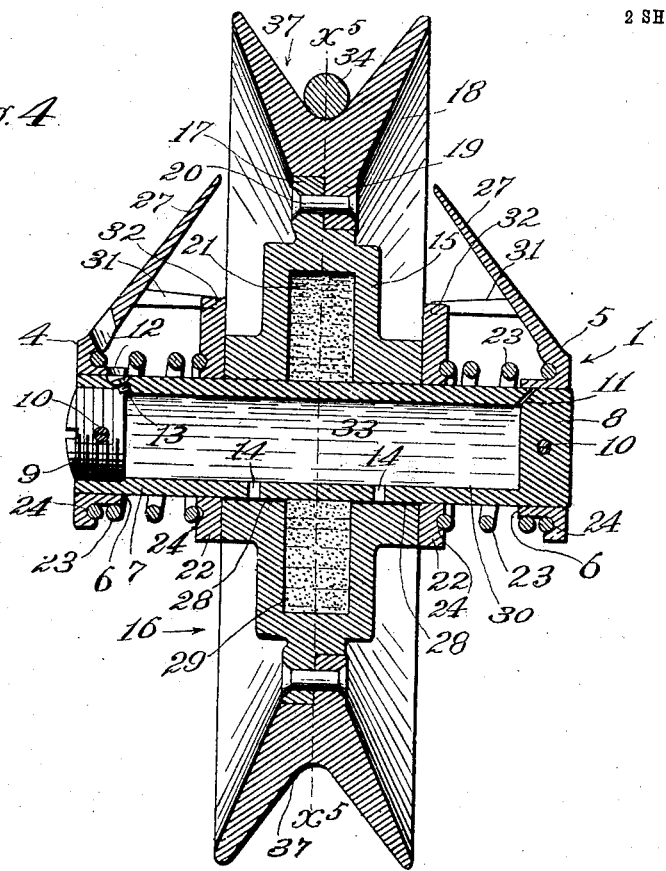

No. 832,994. PATENTED OCT. 9, 1906.
E. D. McDONALD.
SELF LUBRICATING WHEEL.
APPLICATION FILED AUG. 31, 1905.
2 SHEETS—SHEET 1.
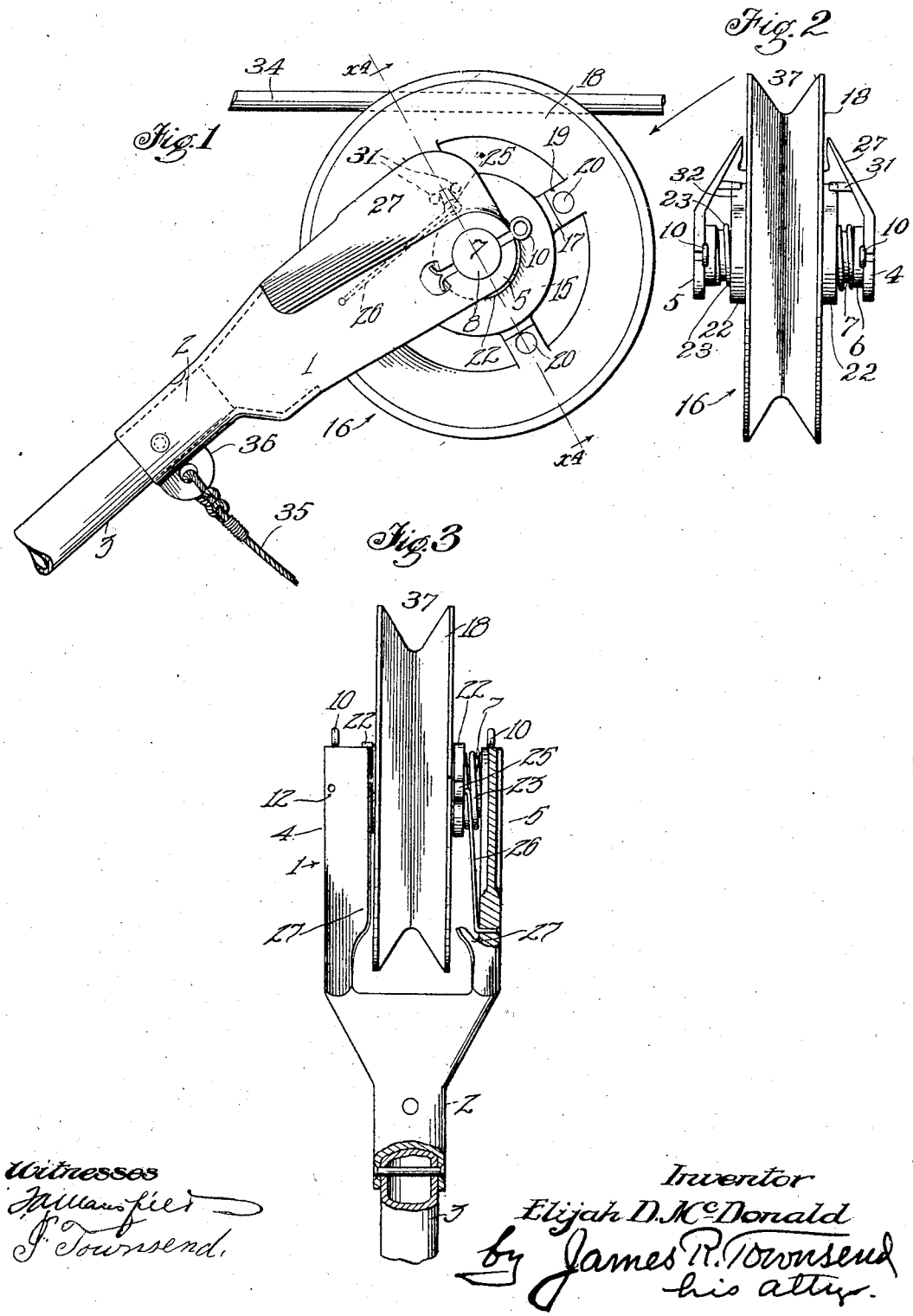
Witnesses
Inventor
Elijah D. McDonald
by James R. Townsend
his atty.

No. 832,994. PATENTED OCT. 9, 1906.
E. D. McDONALD.
SELF LUBRICATING WHEEL.
APPLICATION FILED AUG. 31, 1905.

2 SHEETS—SHEET 2.

Witnesses:
C. C. Heolly
J. Townsend

Inventor,
Elijah D. McDonald.
by James R. Townsend
his atty.

UNITED STATES PATENT OFFICE.

ELIJAH D. McDONALD, OF LOS ANGELES, CALIFORNIA.

SELF-LUBRICATING WHEEL.

No. 832,994. Specification of Letters Patent. Patented Oct. 9, 1906.

Application filed August 31, 1905. Serial No. 276,497.

*To all whom it may concern:*

Be it known that I, ELIJAH D. MCDONALD, a citizen of the United States, residing at Los Angeles, in the county of Los Angeles and State of California, have invented a new and useful Self-Lubricating Wheel, of which the following is a specification.

One important feature of this invention consists in a chambered wheel provided with two forms of lubricant, one form constituting a relatively permanent supply and the other form constituting a replenishable lubricator and solvent which acts as a medium to draw upon the permanent supply to cause the latter to be automatically commingled with the medium and automatically applied as required for lubricating the bearing.

It is of the objects of this invention to provide a trolley-wheel having a maximum life at a minimum cost for lubricants and attention, to provide for ready renewal of the contact-tire, to provide superior durable means for automatic lubrication of trolleys having periods of rest, to allow lateral play of the trolley-wheel without loss of lubricants, and to facilitate supplying and renewing the supply of lubricants.

A difficulty to be overcome with trolley-wheels is the heat generated therein by passage of the electric current through the same, whereby normally fluid lubricating material for the wheel-bearing is rapidly dissipated. Furthermore, in ordinary practice the high speed of rotation causes centrifugal forces to remove fluid lubricants from the bearings. This invention involves a wheel comprising a chambered bearing-pin, a chambered hub, the chambers of said hub and pin communicating through the joint of the bearing, and two kinds of lubricant in said chambers, one kind being of a character that remains practically solid at ordinary atmospheric temperatures and becomes fluid at somewhat higher temperatures and the other kind being fluid at ordinary atmospheric temperatures, whereby when the wheel becomes heated by operation and passage of current the normally solid lubricant becomes fluid and the normally fluid lubricant flows slowly from the bearing-pin, and when the wheel cools from inaction the normally fluid lubricant will collect below, around, and in the bearing-pin.

The normally solid lubricant in the wheel is formed of a composition permeable to the fluid lubricant, and a passage between the chambers is provided below the top of the bearing-pin, so that the fluid lubricant may find its level in the wheel and pin when the wheel is at rest.

I have by practical use demonstrated that with such a trolley the oiling is automatic and self-renewing to such an extent that no attention is required during the life of an ordinary contact-tire, which in trolley-wheels is six thousand miles or more.

I have further demonstrated by actual use that by replacing the contacts or tires of trolley-wheels as they become worn out the hub and bearing-pin will outlast eight renewals of tires with eight recharging of lubricants, exceeding fifty-four thousand miles of travel with one trolley-wheel and renewed tires, as stated.

It is an object of my invention to make possible the results stated.

The accompanying drawings illustrate the invention.

Figure 5:
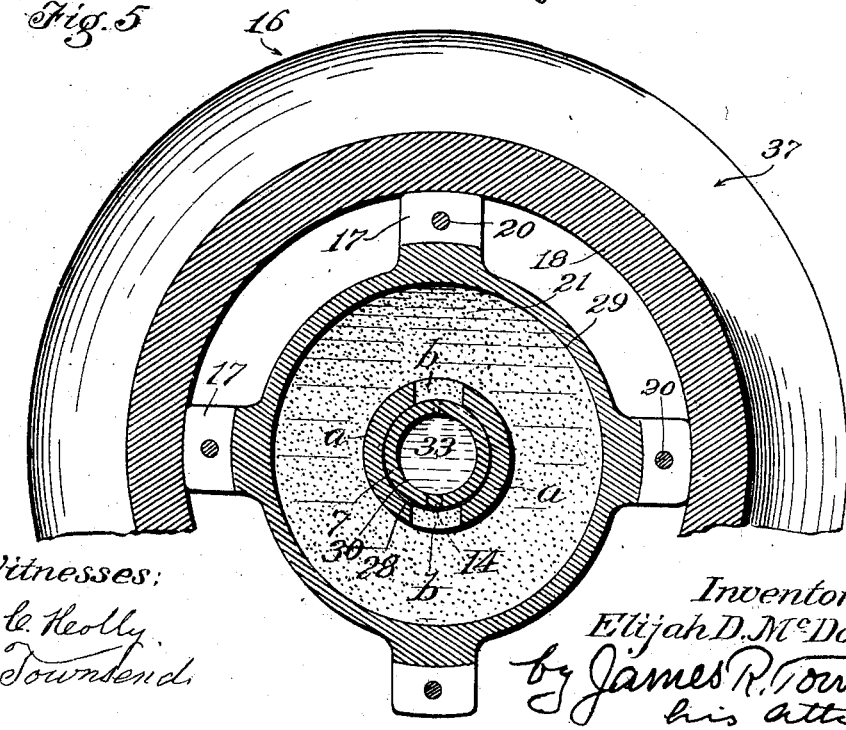

Figure 1 is a side elevation of a trolley embodying the invention in place on a trolley-wire. Fig. 2 is a view of the upper end of the trolley looking aslant toward the trolley-pole, as indicated by the arrow and viewing the ends of the harp-wings and the shunting device. Fig. 3 is a plan view from a plane parallel with the trolley-pole, a portion of the harp being sectioned and a portion of the trolley-pole and harp-shank socket being sectioned. The trolley-wire is omitted from Figs. 2 and 3. Fig. 4 is a section on line $x^4 x^4$, Fig. 1, looking in direction of the small arrows. A fragment of the trolley-wire is also shown. Fig. 5 is a section on line $x^5 x^5$, Fig. 4, the trolley-wire being omitted.

In its preferred form the invention comprises a harp 1, having a shank or socket 2, which receives the upper end of the trolley-pole 3, the latter being riveted or otherwise fastened thereto. The harp 1 is provided with wings 4 and 5, each of which has an inwardly-projecting boss 6, both bosses being drilled to receive a tubular bearing-pin 7, one end of which has preferably an integral permanent closure or head 8, the other end being internally screw-threaded and being closed by a removable screw plug or head 9. Cotter-pins 10 pass through the respective bosses 6 of wings 4 and 5 and through the respective heads 9 and 8, serving to not only hold the bearing-pin 7 in position, but to also hold the screw-plug 9 in position, preventing it from accidentally unscrewing.

The bearing-pin 7 in the upper wall thereof, near the head 8, is provided with a small vent 11. The boss of wing 4 and the upper wall of pin 7 are drilled, forming a filling-orifice 12, normally closed by a screw-plug 13. The lower wall of the bearing-pin 7 is provided with ducts 14, arranged, preferably, in line with each other and within the bearing of hollow hub 15 of the trolley-wheel 16, as shown in Fig. 4, said hollow hub 15 being rotatably mounted on the bearing-pin 7 and with a bearing-surface of large area upon the bearing-pin 7. The hub 15 is provided with a series of lugs 17, and a grooved or flanged rim or tire 18 encircles the hub 15 and is provided with lugs 19, which may be fastened to the lugs 17 by rivets 20, or the tire may be detachably fastened to the hub 15 in any other desired manner. When the tire 18 has become worn so as to be unfit for use, it may be quickly removed from the hub 15 by knocking out the rivets 20, whereupon a new tire may be quickly riveted to the hub 15.

The hollow hub 15 is packed with a relatively hard, solid, semisolid, or plastic lubricating compound 21, melting at about 110° Fahrenheit and which may be formed, preferably, of tallow, beeswax, castor-oil, and graphite, the same being poured into the hollow hub while melted. The tubular bearing-pin 7 is filled with fluid lubricating-oil through the orifice 12, the vent 11 permitting air to escape from the tubular pin to facilitate the filling and allow the tubular pin to be completely filled with the fluid oil. After filling the pin with oil the hole 12 may be plugged with the screw 13 to prevent the oil from spilling out of the pin.

The bearing-surfaces between the hub 15 and bearing-pin 7 are extended across the chamber of the hub by bars $a$ with openings or cut-away portions $b$ between them above and below the pin and are lubricated in a manner about to be described. In order to prevent the lubricant from escaping at the outer ends of the joint between the hub and pin, tightly-fitting lubricant-retaining contact-plates or washers 22 are employed, each of which is closely fitted to the bearing-pin 7, but is slidable thereon, although fitting more closely to the pin than hub 15, and resiliently pressed against the hub by a coil-spring 23, the plates 22 and wings 4 and 5 being provided with annular grooves or recesses 24, into which the opposite ends of the springs 23 take, the latter being thus supported out of contact with the bearing-pin 7 and prevented from slipping out of place. Means are provided to connect the contact-plates 22 directly with the harp and prevent said plates from turning. Each may be provided with a lug 25, into which the offset end of a stiff wire 26 projects, the other end of the wire 26 being offset and driven into a perforation in the adjacent wing of the harp.

The wings of the harp 1 are provided with slanting guards or shunts 27, which slope from the wheel to the hubs of the harp to shunt the wire over said hub in case of misplacement of the trolley-wire. The wheel-hub 15 has a slight clearance on bearing-pin 7, and in practical use said clearance will cause a slight opening or way beneath the bearing-pin, as indicated at 28 in Fig. 4. The contact-plates 22, being held in constant tight contact with the trolley-hub 15, form closures for the outer ends of the ways 28, while the inner ends of said ways communicate with the chambers 29 and 30 of the trolley. An additional means connecting the contact-plates with the harp and to prevent rotation of said plates consists of studs 31, bent in from the shunts 27 of the wings and engaging said plates by means of a lug 32 on each, which is embraced by the studs 31.

In operation the relatively thin lubricant or oil 33 within the bearing-pin 7 percolates through the orifices 14 onto the bearing-faces of the hub, and as the current passes through the wheel and the trolley rotates the oil which has percolated through the orifices 14 rotates with the trolley-wheel, and owing to the centrifugal force and the capillarity of the oil it is caused to work out through the orifices 14. The oil which thus works through the orifices 14 reaches the chamber 29 of the hub and softens some of the lubricating compound 21 therein which lies nearest at the bearing-pin 7 and gradually permeates the mass of hard lubricant, which will also be softened by the heat caused by the passage of electric current from wire 34. The oil combining with the solid lubricant forms a lubricant which creeps along the bearing-faces between the hub 15 and pin 7 and further mixes with the oil which has worked through the orifices 14, thus giving a proper lubrication on the bearing-faces between the hub 15 and pin 7. This lubricant is thus thinner than the compound 21 and is thicker than the oil in the bearing-pin, so that a proper consistency is secured, and it is prevented from escaping by the retaining contact-plates 22. The plates 22 and spiral springs 23 allow the trolley-wheel to play sidewise on the pin 7, thereby preventing it from leaving the wire on account of the rocking movements of the car, but always maintain close contact with the hub 15, so that the lubricant cannot escape. When the trolley-wheel comes to rest thereupon, owing to the force of gravity and the capillarity of the oil it gradually percolates back, seeking its level, and fills the interior of the bearing-pin, to be again partially drawn out of the pin when the trolley resumes is rotation. Thus the lubricant is automatically kept in circulation, and an even consistency is maintained. Its temperature is kept at a sufficiently low point to prevent dissipation, and it is automatically renewed, drawing from the store of compound 21.

It is obvious that during continued use the consistency of the oil within the pin 7 will become thicker, owing to the gradual combining therewith of the compound 21. The oil within the pin 7 may from time to time be replenished so as to prevent the lubricant from becoming too thick, and the worn-out lubricant is thus removed from time to time when replenishing the pin. The amount of normally solid or plastic lubricant that may be stored in the hollow hub 15 is sufficient to last for a very long time. In practice I have found that the supply of thin lubricant will last until it becomes necessary to renew the detachable tire 18, and the supply of solid or plastic lubricant will last the life of the trolley-wheel until nine of the tires 18 have been worn out. Thus the trolley is supplied with two lubricants, one of which is hard and forms a relatively permanent supply, the other being comparatively thin, and the two lubricants are by the forces at work during the rotation of the trolley-wheel combined to form a lubricant having a mean consistency, and this lubricant which performs the lubrication may be renewed from time to time, as occasion demands, by supplying new fluid lubricant to the pin 7. So far as I am aware this is a novel feature, and I have found in practice that it is of great value in that the trolley-wheel requires very little attention compared to the ordinary trolley-wheel, that it never runs hot, and that its wearing qualities are exceedingly great, owing to the effective lubrication provided, whereby practically the only wear which occurs is that upon the tire 18. Thus the tires 18 being detachable a considerable number of tires may be used before the other parts of the trolley become so worn as to be unfit for use.

The trolley-line 35 is most readily attached to the trolley by means of the eye 36, and the trolley handled thereby may be pulled down by the conductor and brought to position with the wire 34 in proper place in the groove 37 of the tire. In case the groove 37 does not receive the trolley-wire the same will be shunted by the harp, and the conductor is thus informed that the wire is not in the groove.

By making the solid lubricant of constituents in proportions, by weight, as follows the best results have been obtained—viz: nine parts mutton-tallow, seven parts castor-oil, two parts graphite, and one part beeswax.

What I claim is—

1. A wheel having a lubricant-chamber, a relatively hard lubricant therein, a bearing-pin supporting the trolley-wheel and having a lubricant-chamber with communication with the former chamber, and a relatively thin lubricant in the second-named chamber.

2. A bearing-pin having a lubricant-chamber, a wheel having a lubricant-chamber, said chambers communicating, a relatively thick lubricant in one of said chambers, and a relatively thin lubricant in the other chamber.

3. A bearing-pin having a lubricant-chamber, a wheel having a lubricant-chamber, said chambers communicating, a relatively thick lubricant in one of said chambers and a relatively thin lubricant in the other chamber, said wheel having lateral movement on the pin, and means constantly bearing against both sides of the wheel and against the pin for preventing escape of the lubricant.

4. A tubular bearing-pin having a vent in one end, a removable head in the other end, a wheel having an annular chamber and bearings on the pin, the pin having orifices in the bottom wall opening respectively directly against said bearings, and having a filling-orifice near one end.

5. A tubular bearing-pin having a vent in one end, a removable head in the other end, a wheel having an annular chamber and flange bearing on the pin, the pin having orifices in the bottom wall opening respectively directly against said bearing, and having a filling-orifice near one end.

6. A wheel provided with a chambered bearing-pin, a chambered hub thereon, a passage being provided communicating between said chambers below the top of the bearing-pin, and a filling for said chambers comprising a normally fluid lubricant and a permeable composition through or into which the fluid lubricant may flow.

7. A chambered wheel provided with a hollow pin with two forms of lubricant, one form being in the pin and the other outside the pin one form constituting a relatively permanent supply, and the other form constituting a replenishable lubricator and solvent which acts as a medium to draw upon the permanent supply to cause the latter to be automatically commingled with the medium and automatically applied for lubricating the bearing.

8. A wheel comprising a chambered bearing-pin, a chambered hub around the same, the chambers of said hub and pin communicating through the joint of the bearing; and two kinds of lubricant in said chambers, one kind being of a character that remains practically solid at ordinary atmospheric temperatures and becomes fluid at somewhat higher temperatures, and the other kind being fluid at ordinary atmospheric temperatures, whereby, when the wheel becomes heated by operation and passage of current, the normally solid lubricant becomes fluid and the normally fluid lubricant flows slowly from the bearing-pin, and when the wheel cools from inaction the normally fluid lubricant will collect below, around and in the bearing-pin.

9. A wheel provided with a chambered bearing-pin having a lubricating-outlet, a chambered hub journaled on the pin and covering said outlet and having bearings rotating on the pin extending across the chamber of the hub with cut-away portions leading into the chamber of the hub above and below the middle of the pin.

10. In combination, a hollow pin, there being openings leading from the interior to the periphery of said pin, a wheel mounted on said pin and provided with a hub extending over said openings, there being a clearance between the pin and the hub, a lubricant-retaining plate mounted on the pin, a spring holding said lubricant-retaining plate against the hub, and supporting means for the pin.

11. In combination, a hollow pin, there being openings leading from the interior to the periphery of said pin, a wheel mounted on said pin and provided with a hub extending over said openings, there being a clearance between the pin and the hub, a tightly-fitting lubricant-retaining plate mounted on the pin, a spring holding said plate against the hub, supporting means for the pin, and means preventing the rotation of the plate on the pin.

In testimony whereof I have hereunto set my hand, at Los Angeles, California, this 25th day of August, 1905.

ELIJAH D. McDONALD.

In presence of—
   JAMES R. TOWNSEND,
   JULIA TOWNSEND.